May 19, 1931.      V. MEYER      1,806,483
HORSE BIT
Filed Nov. 23, 1929
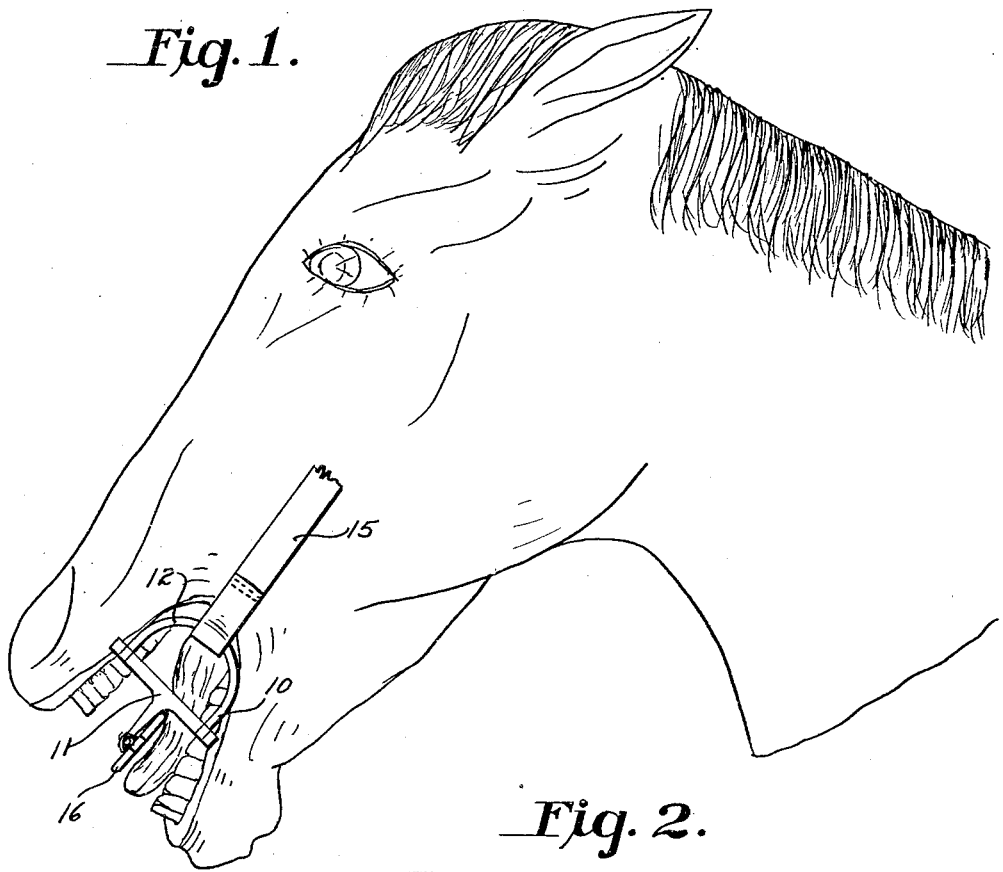
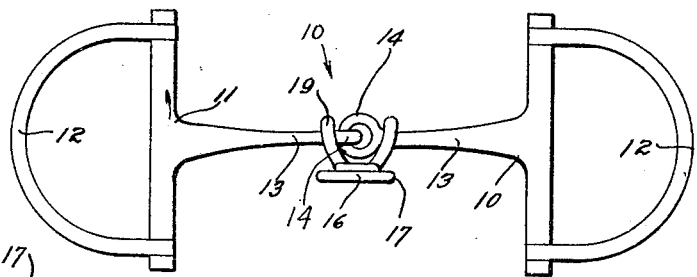
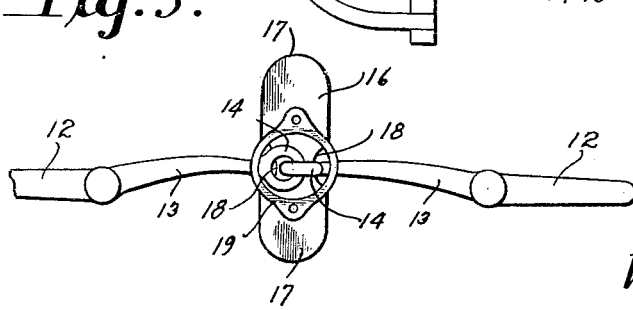
Inventor
Victor Meyer.
By *Clarence A. O'Brien*
Attorney Patented May 19, 1931

1,806,483

UNITED STATES PATENT OFFICE

VICTOR MEYER, OF BROOKLYN, NEW YORK

HORSE BIT

Application filed November 23, 1929. Serial No. 409,313.

This invention relates to improvements in horse bits and has for its primary object the provision of a device for preventing the tongue of a horse or animal from getting over the bit, which position of the bit when under the tongue is harmful and injurious to the mouth of the animal when tightening up on the reins.

Another object of the invention is to provide an animal bit of the kind embodying a pair of loosely jointed bit sections on which a plate is loosely mounted at the loose joint between the sections and which is adapted to lie flat upon the tongue of the animal to prevent the animal from lifting his tongue over the mouth piece of the bit.

A further object is the provision of a bit attachment of the above character which is simple of construction, inexpensive of manufacture, and which may be applied to the animal bits now in use without altering the construction thereof.

With these and other objects in view, the invention resides in the certain novel construction combination and arrangement of parts, the essential features of which are hereinafter fully described, are particularly pointed out in the appended claims, and are illustrated in the accompanying drawings, in which:

Figure 1 is an elevational view showing my improved bit in position within an animal's mouth.

Figure 2 is a front elevational view.

Figure 3 is a top plan view.

Referring to the drawings by reference characters, the numeral 10 designates an animal bit in its entirety and in this instance the same includes a pair of substantially T-shaped bit sections 11—11, the cross ends of which are provided with pivotally mounted loops or eyes 12—12, while the shanks 13—13 terminate in engaging eyes 14—14 whereby to produce a flexible mouthpiece for insertion into the animal's mouth when the bit is in an applied position as shown in Figure 1 of the drawings. It is of course understood that the reins or bridle straps 15 connect with the eyes 12—12 in the usual manner and for the purposes which are well known.

Mounted on the mouthpiece adjacent the flexible joints is an elongated flat like tongue plate 16, the ends of which are rounded as at 17 as are the side edges so that no sharp corner exists which might injure the mouth of the animal. The side edges of the plate 16 are cut inwardly as at 18 to permit flexing of the bit section, while formed integral or riveted to the upper side of the plate 16 is an attaching bracket or bridge 19 which is arched as best seen in Figure 2 of the drawings for permitting the passing of the shank 13 of the bit members between the bracket and the adjacent side of the tongue plate 16. The bracket or bridge piece 19 is relatively open as seen in Figure 3 to accommodate the interconnecting eyes 14 so as not to interfere with the flexing of the joints, the said eyes also serving to prevent lateral or longitudinal shifting of the plate 16 and limiting turning movement of the said tongue plate to prevent the same from completely rotating upon its support.

In practice, and by reference to Figure 1 of the drawing, it will be noted that when the mouthpiece of the bit is within the mouth of the animal, the plate 16 is disposed above the animal's tongue and extends sufficiently inward to prevent the animal from slipping his tongue over the mouthpiece of the bit. Without the use of my guard plate, it is possible for the tongue of the animal to slip over the bit when the reins are slacked and when pulling backward upon the reins, the tongue and the mouth of the animal may be injured. This objection of course is overcome by the use of my improved tongue plate which has been fully explained hereinbefore.

Having thus described my invention, what I claim as new and desire to secure by Letters-Patent, is;

1. In combination with an animal bit having a mouthpiece embodying two loosely jointed sections, a tongue plate, and means for loosely connecting said tongue plate to said mouthpiece at the joint between said bit sections, said means including an arched bracket secured to said plate for the passage of said mouthpiece between said bracket and said plate.

2. In combination with an animal bit having a mouthpiece embodying two loosely jointed sections, a tongue plate, and means for loosely connecting said tongue plate to said mouthpiece at the joint between said bit sections, said means including an arched bracket secured to the plate for the passage of a mouthpiece between the bracket and said plate, and said arched bracket being cut out to embrace the joint between the loosely jointed sections of the tongue mouthpiece.

In testimony whereof I affix my signature.

VICTOR MEYER.